United States Patent Office 3,608,184
Patented Sept. 28, 1971

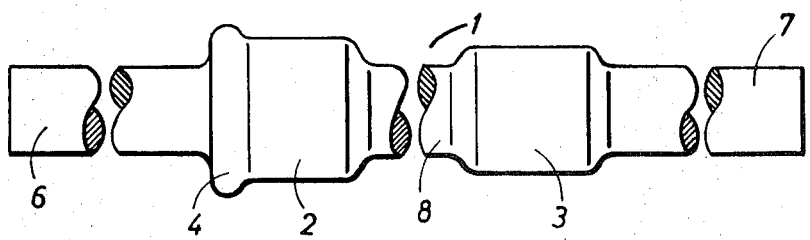
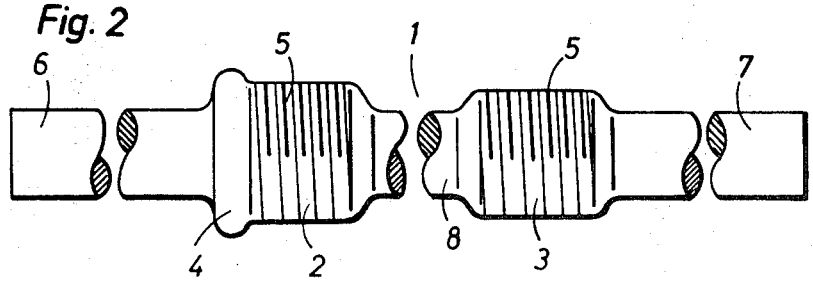
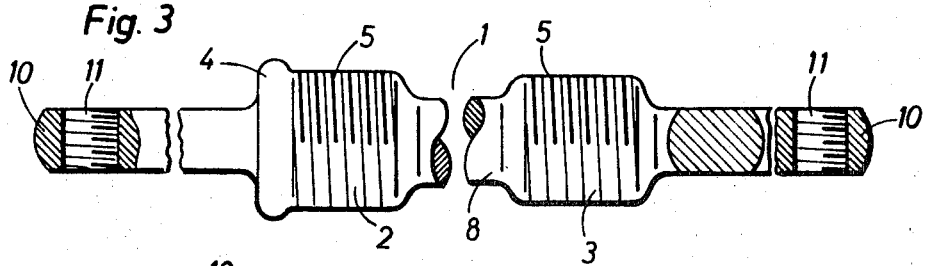
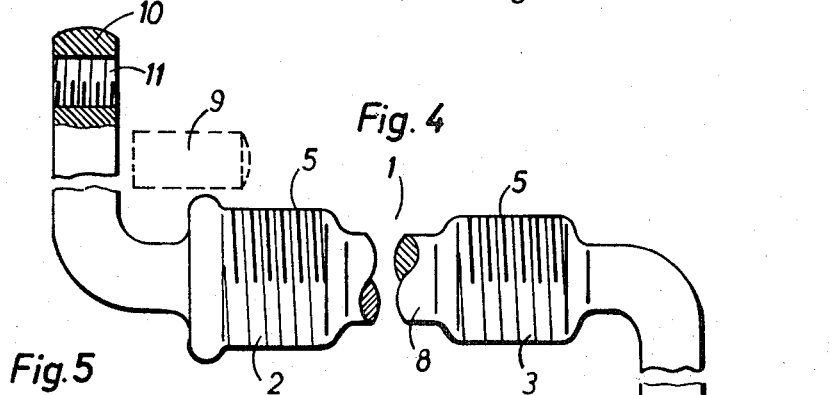

3,608,184
CRANK FORMING METHOD
Alfred Thun, Ennepetal-Vorde, Germany, assignor to Alfred Thun & Co. G.m.b.H., Ennepetal-Altenvoerde, Germany
Filed Mar. 18, 1969, Ser. No. 808,151
Claims priority, application Germany, Mar. 21, 1969, P 17 52 015.9
Int. Cl. B23p 13/04
U.S. Cl. 29—557
7 Claims

ABSTRACT OF THE DISCLOSURE

A method for making a bicycle tread crank from a rod includes the steps of forming a collar in the center of an elongated rod, subsequently forming threads on the collar, and subsequently bending the free ends of the rod in directions opposite to each other to form cranks.

BACKGROUND OF THE INVENTION

(1) Field of the invention

This invention relates to bicycle manufacture and more particularly to a method for the fabrication of a bicycle tread crank having two integral cranks joined to a threaded crank axle and facing in opposite direction.

(2) Description of the prior art

Bicycle tread cranks are generally drop-forged in one piece. Thereafter, threads for the ball bearing cones are cut into the crank axle and subsequently the cranks are polished, chrome or nickel plated or the like.

The grinding process necessary for finishing the forged tread cranks before plating or polishing is expensive, particularly since it must be preceded by a deburring process.

In another method this grinding can be avoided. A prefabricated sleeve provided with suitable threading for the ball bearing cones is slipped over a rod and permanently mounted on it. Thereafter the cranks are formed by pressing flat the rod end portions and bending them almost rectangularly to the tread crank axle in directions opposite to each other. However sleeves for the ball bearing cones which are slipped over a rod may not be as strong or as firmly positioned as integral sleeves formed under the forging process. In addition, the separate fabrication of such sleeves including the forming of threads thereon, and the mounting of the sleeves on the rod involves additional expense.

Under either method with threads formed by usual cutting processes the crank may have unfavorable flow lines and an insufficiently smooth surface which interfere with subsequent refinements such as chrome plating.

SUMMARY OF THE INVENTION

It is an object of the present invention to provide an inexpensive method for fabricating bicycle tread cranks.

It is a further object of the present invention to provide a method for forming a bicycle tread crank whose threaded region for the mounting of ball bearing cones is as stable as that of cranks formed by drop forging methods, and which avoids the step of separate fabrication of such collars.

It is a further object of the present invention to provide a method for manufacture of bicycle tread cranks and the necessity for grinding and other finishing operations prior to chrome plating is minimized.

Briefly stated, these and other objects are achieved by forming the central portion of a rod with a collar, subsequently forming threads for the reception of the ball bearing cone on the collar, and subsequently bending the free ends of the rod back in opposite directions from each other to form cranks.

BRIEF DESCRIPTION OF THE DRAWINGS

FIG. 1 shows a rod section, some portions being broken away, at the completion of the step of forming collars for reception of ball bearing cones.

FIG. 2 is a view similar to FIG. 1, showing a rod after the formation of threads on the collar sections.

FIG. 3 is a view, similar to FIG. 1 of a rod subsequent to the steps of forming spherical heads and flattening the regions between the heads and the collars.

FIG. 4 is a view similar to FIG. 1 of a rod subsequent to the bending of the free ends to form cranks.

FIG. 5 is a side view of the end portion of a finished crank.

DESCRIPTION OF A PREFERRED EMBODIMENT

Referring now to FIG. 1, a rod section 1 is drawn so as to have a generally round cross section and two cylindrical collars 2 and 3 are provided, e.g. by being forged, on its central portion while the rod is hot. Collar 2 is formed with a larger diameter than collar 3. A molded-on shoulder 4 is formed on that end of collar 2 which faces the closest free end 6 of the rod.

Referring now to FIG. 2 external threads 5 are provided, e.g. by being rolled while the metal is still hot, in a second working step, onto the collars 2 and 3. The outer diameter of the thread 5 of collar 3 is smaller than the root diameter of the thread 5 of collar 2.

Referring now to FIG. 3, spherical heads 10 are provided at the free ends of the rods 6 and 7. Thereafter, the rod end portions are pressed flat. Threaded bores 11 are now provided in the threaded spherical head 10 to hold the pedals.

Referring now to FIG. 4, the rod portions on opposite sides of the collar are now bent while cold at approximately right angles to the crank axle 8.

Thereafter a pin 9 is fastened, preferably by press welding, to serve as an entraining lug for the sprocket wheel (not shown) which will be connected to the crank axle when the bicycle is assembled.

If desired, the crank can be chrome-plated after the bending of the flat rod portions. No additional polishing of the surface will be necessary to achive an almost mirror-like surface.

During the assembly of the bicycle ball bearing cones are slipped on over one crank and over its bent portion onto the crank axle.

The molding of thread regions which have a larger diameter than the crank axle provides higher stability than a tread crank with generally welded on thread sleeves. Moreover, material accumulations are created, as for example, at spherical heads 10, which permit even with relatively slim cranks the arrangement of threaded bores having relatively large diameters for the attachment of pedals.

It will be understood that the above description of the present application is susceptible to various modifications, changes and adaptations.

I claim:

1. A process for making a bicycle tread crank, comprising the steps of:
   (a) forming spaced cylindrical collars at a central portion of an elongated rod;
   (b) forming external threads on the collars;
   (c) flattening the extreme end portions on the rod;
   (d) forming threaded bores through said extreme end portions; and
   (e) bending those rod portions lying outward of said collars in opposite directions to positions approximately at right angles to the central portion, whereby said central portion with said collars comprises the crank axle and the oppositely disposed rod portions comprise the crank arms.

2. A process as in claim 1, wherein said collars at the central portion of the rod are formed by forging the rod while hot.

3. A process as in claim 1, wherein the external threads on the collars are formed by rolling.

4. A process as in claim 1, wherein the extreme end portions are flattened by pressing.

5. A process as in claim 1, wherein those rod portions are bent while cold.

6. A process as in claim 1, wherein a pin member is fastened to one of the oppositely disposed rod portions at a position between the crank axle and the flattened end portion, said pin being directed toward the central portion and parallel therewith.

7. A process as in claim 1, wherein the surface of the completed crank is chrome plated.

References Cited

UNITED STATES PATENTS

| 601,415 | 3/1898 | Gubelmann | 74—594.2 |
| 624,635 | 5/1899 | Fauber | 74—594.2 |
| 643,349 | 2/1900 | Fauber | 74—594.2 |
| 2,341,469 | 2/1944 | Newall | 72—377X |
| 3,314,277 | 4/1967 | Hopkins et al. | 72—377X |
| 1,913,171 | 6/1933 | Schaefer | 72—378X |

FOREIGN PATENTS

| 24,150 | 1/1897 | Great Britain | 74—594.2 |

JOHN F. CAMPBELL, Primary Examiner

V. A. DI PALMA, Assistant Examiner

U.S. Cl. X.R.

29—6; 74—594.1

UNITED STATES PATENT OFFICE
CERTIFICATE OF CORRECTION

Patent No. 3,608,184         Dated September 28th, 1971

Inventor(s) Alfred Thun

It is certified that error appears in the above-identified patent and that said Letters Patent are hereby corrected as shown below:

In the heading of the patent, line 3, change "Vorde" to --Voerde--; line 7, change "1969" to --1968--.

Signed and sealed this 9th day of May 1972.

(SEAL)
Attest:

EDWARD M. FLETCHER, JR.          ROBERT GOTTSCHALK
Attesting Officer                 Commissioner of Patents